United States Patent [19]

Ito et al.

[11] Patent Number: 4,832,468
[45] Date of Patent: May 23, 1989

[54] DIMMING WINDOW

[75] Inventors: Toshiyasu Ito; Takaaki Mori; Jun Minoura; Mikio Adachi, all of Aichi, Japan

[73] Assignee: Toyoda Gosei Co., Ltd., Nishikasugai, Japan

[21] Appl. No.: 851,151

[22] Filed: Apr. 14, 1986

[30] Foreign Application Priority Data

Apr. 13, 1985 [JP] Japan .............................. 60-55276[U]

[51] Int. Cl.⁴ ........................... G02F 1/01; G02F 1/17
[52] U.S. Cl. .................................................. 350/357
[58] Field of Search ................... 350/357, 399, 331 R, 350/334

[56] References Cited

U.S. PATENT DOCUMENTS 3,873,185  3/1975  Rogers ............................ 350/399 X
4,175,836  11/1979  Redman et al. .................... 350/357

FOREIGN PATENT DOCUMENTS 67729    5/1980   Japan .................................. 350/357
184129   10/1983  Japan .................................. 350/357
2112557  7/1983   United Kingdom ................ 350/357

Primary Examiner—Eugene R. LaRoche
Assistant Examiner—Nathan W. McCutcheon
Attorney, Agent, or Firm—Cushman, Darby & Cushman

[57] ABSTRACT

Herein disclosed is a window having a dimming function. This dimming window comprises: a transparent plate having a generally rectangular shape; a plurality of solid electrochromic elements extending in the longitudinal direction of a pair of opposed sides of the transparent plate; and a controller for controlling the electrochromic elements independently of one another.

7 Claims, 3 Drawing Sheets

DIMMING WINDOW

BACKGROUND OF THE INVENTION

1. Field of the Invention

The present invention relates to a dimming window to be applied to a field requiring a dimming function, such as windows of buildings or automobiles.

2. Description of the Prior Art

In recent years, from the standpoint of diversification of designs and/or energy economy in cold seasons, there has been a tendency for windows of buildings or automobiles to have enlarged areas, so that they transmit more and more solar rays directly into the rooms or compartments.

However, this leads to the drawback that the rooms or compartments receive thermal rays during hot seasons, and have their privacies invaded during all seasons.

With this in mind, there have arisen windows which are so shielded with ray reflecting films that they may become difficult to see from the outsides.

If these windows are adopted, the rooms or compartments are always kept shielded, because the aforementioned film has a constant optical transmissivity, thus raising a problem that the rooms or compartments cannot be brightened or darkened, even if necessary.

Another problem is that the window glasses having colored films applied thereto are not preferable in designs.

It is, therefore, conceivable to provide a window which is enabled to dim or adjust the quantity of light to be transmitted through its glass by applying such a sheet of solid electrochromic element to the window glass as can have its optical transmissivity varied in accordance with the voltage applied.

In accordance with the gradient of solar rays or the kind of windows, however, a certain upper or lower horizontal portion of the window glass may have to be exclusively shielded.

In the front windshield of an automobile, for example, rather than the uppermost horizontal portion requiring shielding, a slightly lower horizontal portion may require the dimming operation. On the other hand, a building may have its window shielded not at its upper glass portion, but at its lower glass portion. These cases have failed to cope with by the window or windshield which has a single but large electrochromic element applied to its glass.

SUMMARY OF THE INVENTION

An object of the present invention is to provide a window which can have its transparent plate sections shielded individually.

In order to achieve the above-specified object, a dimming window according to the present invention comprises: a transparent plate having a generally rectangular shape; a plurality of solid electrochromic elements extending in the longitudinal direction of a pair of opposed sides of said transparent plate; and a controller for controlling said electrochromic elements independently of one another.

Other objects of the present invention will become apparent if the embodiments of the invention to be described are understood, as is clearly defined by the appended claims. Moreover, a number of advantages left untouched herein will occur to those skilled in the art, if the present invention is put into practice.

DETAILED DESCRIPTION OF THE PREFERRED EMBODIMENTS

The first embodiment, in which the present invention is embodied on a front windshield of an automobile, will be described in the following with reference to FIGS. 1 to 4.

Figure 1:
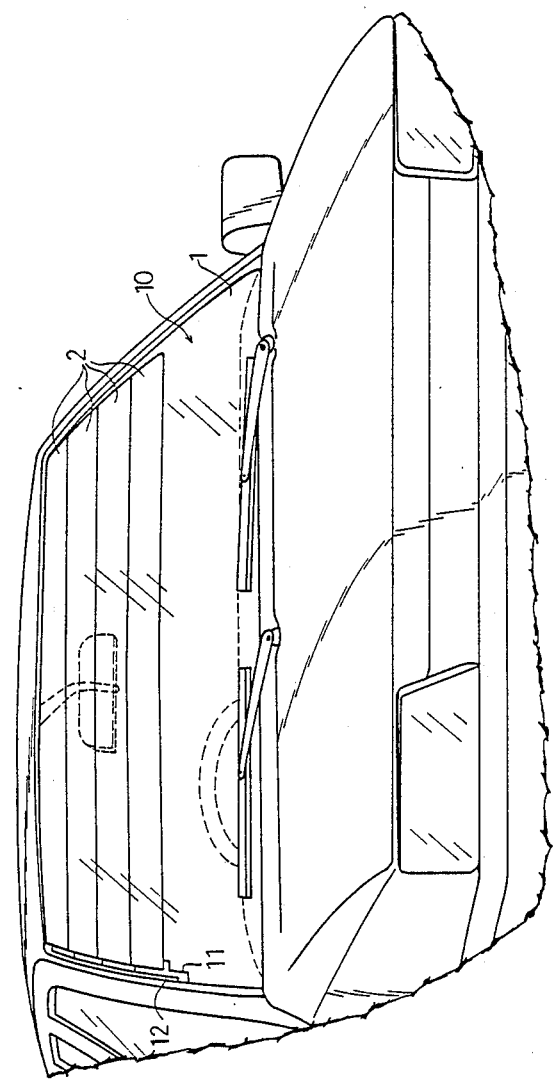
FIG. 1 is a perspective view showing a first embodiment of the present invention, which is embodied on a windshield of an automobile, where a plurality of sheets of solid electrochromic elements are applied to the front windshield.

As shown in FIG. 1, a dimming window 10 according to the first embodiment is constructed of one transparent plate 1 and a plurality of sheets of solid electrochromic elements 2 which are joined to the inner side of the transparent plate 1 and with which lead wires 11 and 12 are connected.

Each of the solid electrochromic elements 2 is formed into a transversely elongated rectangular shape and joined to the transparent plate 1. Moreover, the plural sheets of solid electrochromic elements 2 are so arrayed vertically of the transparent plate 1 that they do not overlap on one another.

It is possible to apply equal or different voltages simultaneously to the solid electrochromic elements 2 or equal voltages to the same for different time.

Figure 2:
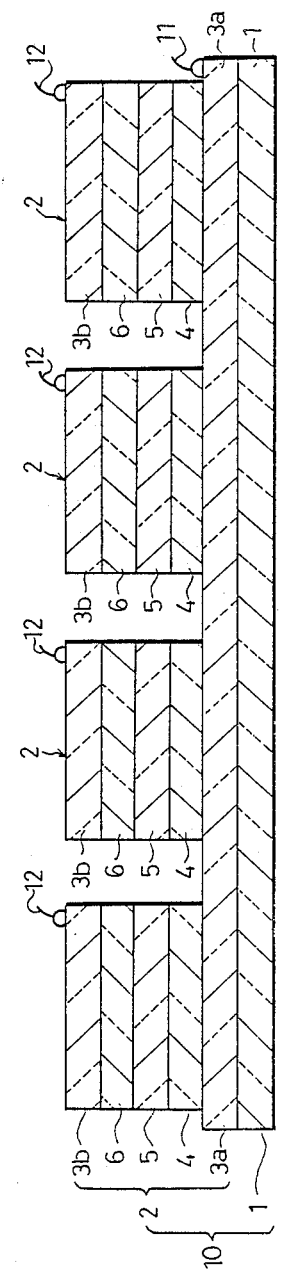
FIG. 2 is an enlarged section showing the solid electrochromic element according to the first embodiment.

As shown in FIG. 2, each solid electrochromic element 2 is composed of: an electrode $3a$ laminated directly on the transparent plate 1; an oxidized color developing layer 4 laminated directly on the upper surface of the same electrode $3a$; and an ion donor layer 5, a reduced color developing layer 6 and an electrode $3b$ laminated likewise in the order recited.

In the plural sheets of solid electrochromic elements 2, moreover, the aforementioned individual layers 4, 5 and 6 and electrodes $3b$ are laminated in the recited order on the common single electrode $3a$, and the lead wire 11 is connected with that electrode $3a$ whereas the electrodes 12 are connected with the plural electrodes $3b$, respectively.

Those electrodes $3a$ and $3b$ are made of a transparent, electrically conductive film of ITO. This ITO is a mixture containing metal oxides, e.g., $In_2O_3$ and $SnO_2$ at a weight ratio of 95:5.

On the other hand, the aforementioned oxidized color developing layers 4 are made of $NiO_x$; the aforementioned ion donor layers 5 are made of $Ta_2O_5$; and the aforementioned reduced color developing layers 6 are made of $WO_3$.

Figure 3:
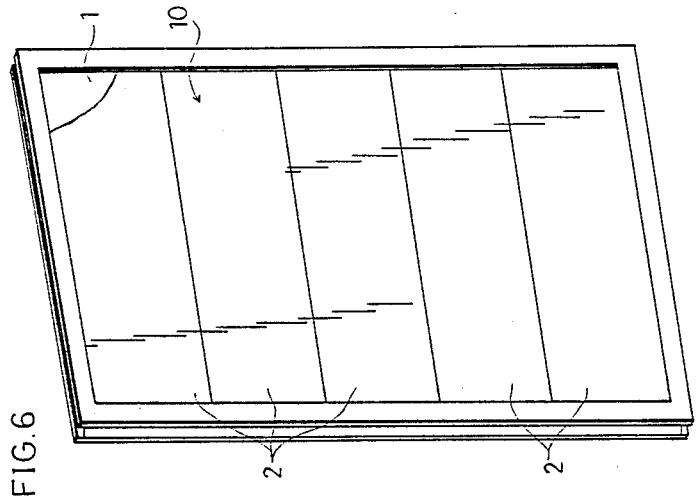
FIG. 3 is a schematic view showing an ion plating apparatus to be used when the solid electrochromic element is joined to a transparent plate.

The dimming window 10 is produced in the following procedures by an ion plating apparatus, for example, as shown in FIG. 3:

(1) Cleaning of Transparent Plate 1

The transparent plate 1 of soda glass is cleaned in a solution of neutral detergent while being exposed to ultrasonic waves and is then rinsed with distilled water and is dried in clean air.

(2) Preparation of Solid Electrochromic Elements 2

(1) The transparent plate 1 is placed on a holder 22 mounted in an upper portion of an ion plating apparatus 21 and is heated by means of a heater 26. Next, an ITO tablet is put into a crucible 23 mounted in a lower portion of the apparatus 21 and is exposed to an electron beam 30 emitted from an electron beam gun 24 so that it is gasified.

Then, the ITO thus gasified is ionized by a low discharge of an electric power of 100 W coming from a high-frequency coil 25 which is placed above the crucible 23.

At this time, the chamber in the aforementioned ion plating apparatus 21 is evacuated to $1 \times 10^{-5}$ Torrs through a discharge pipe 27 and is supplied with an argon gas and an oxygen gas from an inert gas supply pipe 28 such that the partial pressure of the oxygen gas is adjusted to $5 \times 10^{-4}$ Torrs.

In these ways, one sheet of electrode 3a having a thickness of 2,000 Å is formed on the inner surface of the transparent plate 1.

(2) Formation of Oxidized Color Developing Layers 4

In the aforementioned ion plating apparatus 21, a plurality of sheets of oxidized color developing layers 4 are laminated in juxtaposition on the single sheet of electrode 3a which was formed on the upper side of the transparent plate 1.

This lamination is conducted by a method which is similar to that of forming the aforementioned electrode 3a but different in that the electrode layer 3a is so masked that the plural sheets of oxidized color developing layers 4 are arranged at a slight spacing and has its surface laminated by $NiO_x$ from a tablet of simple Ni.

This method is different from the method of forming the electrode 3a, too, in that the oxidized color developing layers 4 are formed by setting the heating temperature of the transparent plate 1 at 300° C., the partial pressure of the oxygen gas at $1 \times 10^{-3}$ Torrs, and the ionizing electric power at 300 W.

Incidentally, the oxidized color developing layers 4 can also likewise be formed even by using a tablet of NiO. In this case, however, this formation is executed by heating the transparent plate 1 at 200° C. and setting the partial pressure of the argon gas at $1 \times 10^{-3}$ Torrs.

In these ways, the oxidized color developing layers 4 having a thickness of 6,000 Å are formed on the surface of the electrode 3a.

(3) Formation of Ion Donor Layers 5

Subsequently, the ion donor layers 5 are formed of a tablet of $Ta_2O_5$ on the upper sides of the oxidized color developing layers 4.

At this time, the ion plating treatment is executed under the conditions that the transparent plate 1 has a temperature of 300° C., that the oxygen gas and the argon gas have a pressure of $5 \times 10^{-4}$ Torrs, and that the ionizing electric power is 300W.

The ion donor layers 5 thus formed have a thickness of 5,000 Å.

(4) Formation of Reduced Color Developing Layers 6

The reduced color developing layers 6 having a thickness of 6,000 Å are made of a tablet of $WO_3$ and laminated on the ion donor layers 5 of the transparent plate 1. At this time, the transparent plate 1 is heated to 200° C., and the partial pressure of the argon gas is adjusted to $1 \times 10^{-4}$ Torrs.

(5) Formation of Electrodes 3b

Under the conditions like the electrode 3a, the electrodes 3b of ITO having a thickness of 2,000 Å are formed on the upper sides of the aforementioned reduced color developing layers 6.

(6) Connection of Lead Wires 11 and 12

Next, the single lead wire 11 is connected with the common electrode 3a lying on the surface of the transparent plate 1, and the lead wires 12 are connected with the plural electrodes 3b, respectively.

Moreover, the transparent plate 1 thus having the plural sheets of electrochromic elements 2 joined thereto is applied to the front windshield of an automobile, and the electrochromic element controller is connected with the lead wires 11 and 12 of the aforementioned electrochromic elements 2, thus constructing the dimming window 10, as shown in FIG. 1.

Figure 4:
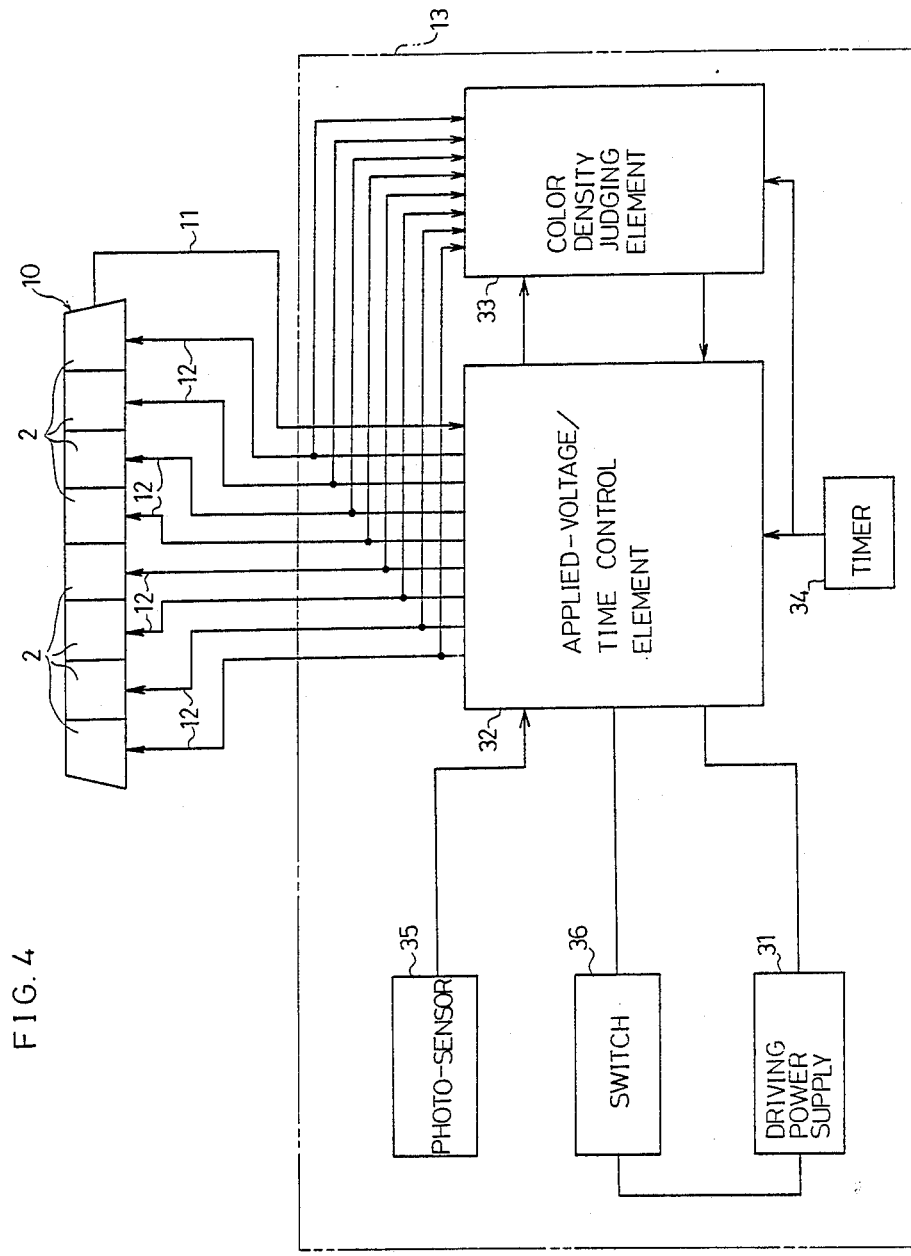
FIG. 4 is a block diagram showing an electrochromic element controller.

As shown in FIG. 4, the electrochromic element controller, as indicated generally at numeral 13, is equipped as its central element with an applied-voltage/time control element 32 for applying equal or different voltages to the electrochromic elements 2, respectively, from a driving power supply 31 and for controlling the application time of the respective electrochromic elements 2.

To the aforementioned element 32, moreover, there are coupled a color density judging element 33 for sampling the polarized voltages using in the color development by the solid electrochromic elements 2 as the parameter of the optical transmissivity of each solid electrochromic element 2 and for feeding back the polarized voltages to the aforementioned element 32, and a timer 34 for feeding commands of operating time to the aforementioned two elements 32 and 33. Incidentally, color density judging element 33 and timer 34 may be omitted, as the case may be.

Timer 34 is also coupled to a photosensor 35 sensing the intensity of the light inside or outside of the compartment to send it to the applied-voltage/time control element 32 so as to determine the voltage to be applied, and a switch 36 for turning on or off electric currents to drive the plural sheets of solid electrochromic elements 2.

The dimming operation of each solid electrochromic element 2 is tested by operating the timer 34 to apply an equal voltage to that element 2.

As a result, oxidizing and reducing reactions are caused between the oxidized color developing layer 4 and the reduced color developing layer 6 of each solid electrochromic element 2 energized so that the front windshield can be dimmed such that its upper to central portions are horizontally divided.

Since the solid electrochromic elements 2 are arranged in the divided manner on the upper to central portions of the front windshield, moreover, a unique decorative design can be exhibited.

Figure 6:
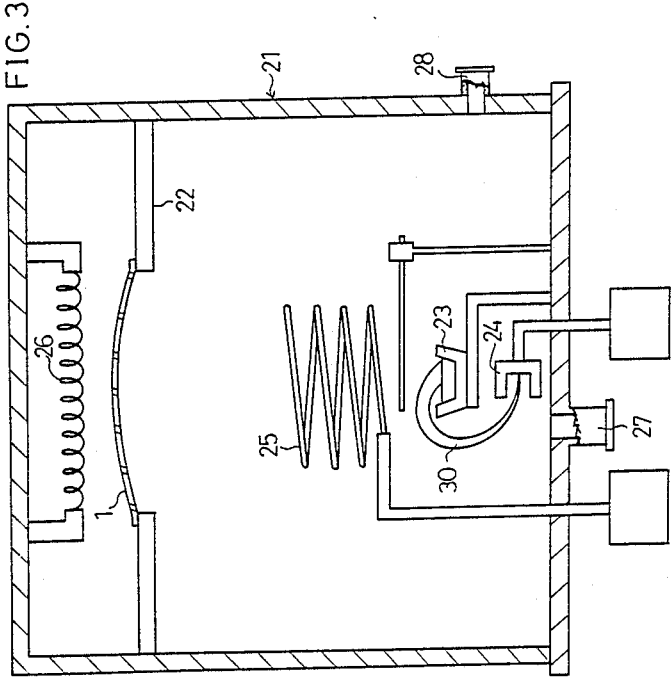
FIG. 6 is a perspective view showing the second embodiment.

Next, a second embodiment, in which the present invention is embodied by a window of a building, will be described with reference to FIGS. 5 and 6.

Figure 5:
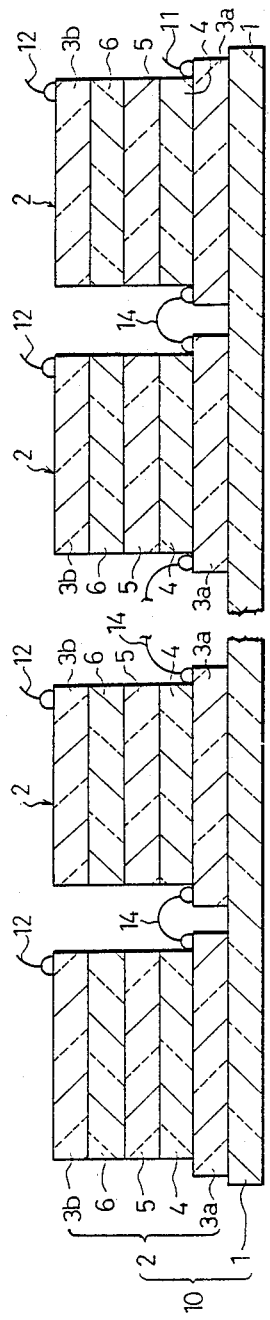
FIG. 5 is a sectional view showing a second embodiment, in which the present invention is embodied on a window of a building, where a plurality of sheets of solid electrochromic elements are applied to the window glass.

According to this embodiment, as shown in FIG. 5, the electrodes 3a to be joined directly to the upper side of the transparent plate 1 are provided for the solid electrochromic elements 2, respectively, and the electrodes 3a of the vertically adjoining solid electrochromic elements 2 are connected with each other by means of a lead wire 14. These plural electrochromic elements 2 thus constructed are adhered to the transparent plate 1 or the window glass of a building, as shown in FIG. 6.

This dimming window 10 can also exhibit the operational effects of the foregoing first embodiment so that it can shield an arbitrary horizontal one of the upper to lower portions of the window glass thereby to enhance the air conditioning efficiency and to hold the privacy of the inside of the room.

The present invention should not be limited to the constructions of the foregoing embodiments but can be practised by the following modes, for example:

(1) The aforementioned transparent plate 1 can be made of not only the inorganic glass but also organic glass such as polymethyl methacrylate.

In the case of using the organic glass, however, the solid electrochromic elements 2 have to be formed on that glass at a temperature lower than the deforming temperature of the glass.

Moreover, the transparent plate 1 may be arranged at either side of the electrodes 3a and 3b.

(2) At least one of the electrodes 3a and 3b may be made of a transparent, electrically conductive film, whereas the other may be so slightly colored that it will not deteriorate the effects of the present invention. The substances making the electrodes 3a and 3b may use $In_2O_3$, $SnO_3$ or Au in addition to those of the foregoing embodiments.

(3) The aforementioned oxidized color developing layers 4 may be made of $Cr_2O_3$, $Ir(OH)_x$, IrO, $Ni(OH)_x$, NiO, Ni, $Rh(OH)_x$, RhO, $Ru(OH)_x$ in addition to those of the foregoing embodiments.

(4) The aforementioned ion donor layers 5 can be made of an arbitrary material, if this material can allow not the electrons but the ions to pass therethrough, such as LiF, $SiO_2$, $ZrO_2$, $MgF_2$, $CaF_2$, $ZrO_2$, $Al_2O_3$, $Y_2O_2$ Na-$\beta$-alumina or $Li_3N(Li^+)$ in addition to those of the foregoing embodiments.

(5) The aforementioned reduced color developing layers 6 can be made of $TiO_2$, $MoO_3$ or $Nb_2O_5$ in addition to those of the foregoing embodiments. The positions of the reduced color developing layers 6 disclosed in each of the foregoing embodiments can be replaced by the laminated positions of the aforementioned oxidized color developing layers 4.

(6) The electrodes 3a and so on are laminated upon the transparent plate 1 by the vacuum evaporation or the sputtering treatment in addition to the ion plating treatment.

(7) The number of the sheets of the electrochromic elements may be any if it exceeds two.

Since it is apparent that widely different modes of embodiments can be constructed without departing from the spirit and scope of the present invention, this invention should not be limited by the specified embodiments except that it is defined by the appended claims.

What is claimed is:

1. A dimming window comprising:
   (a) a transparent plate having a generally rectangular shape and a pair of opposed sides;
   (b) a plurality of solid electrochromic elements extending in a longitudinal direction of said pair of opposed sides of said transparent plate;
   (c) a controller for controlling said electrochromic elements independently of one another, said controller including a driving power supply for selectively energizing said solid electrochromic elements, a switch for turning on and off said driving power supply, and applied-voltage/time control means for applying voltage from said driving power supply to said solid electrochromic elements, and for controlling an amount of time that said voltage is applied to said solid electrochromic elements,
   said applied-voltage/time control means including a color density judging element for sampling, as a parameter of optical transmissivity, polarized voltages from said solid electrochromic elements during color development and for feeding back said polarized voltages to said applied-voltage/time control means, and a timer for sending a command of said time that voltage is applied to said applied-voltage/time control element and said color density judging element.

2. A dimming window according to claim 1, wherein each of said solid electrochromic elements includes:
   an electrode joined to said transparent plate;
   a plurality of layers including an oxidized color developing layer, an ion donor layer and a reduced color developing layer, laminated on said electrode in the order recited; and
   an electrode joined to said reduced layer.

3. A dimming window according to claim 2, wherein said electrode to be joined to said transparent plate is shared commonly among all of said solid electrochromic elements.

4. A dimming window according to claim 2, wherein at least one of said electrode to be joined to said transparent plate and said other electrode is made of a transparent, electrically conductive film.

5. A dimming window according to claim 1, wherein said transparent plate is at least one of the front and rear windshields of an automobile.

6. A dimming window according to claim 5, wherein said solid electrochromic elements are positioned in an upper portion of at least one of said front and rear windshields of said automobile such that they extend wholly in the widthwise direction of said one front or rear windshield and are arranged vertically.

7. A dimming window according to claim 1, wherein said transparent plate is a window glass of a building.

* * * * *